United States Patent
Suda et al.

(10) Patent No.: US 11,465,356 B2
(45) Date of Patent: Oct. 11, 2022

(54) METHOD FOR PREDICTING STRENGTH OF STRUCTURE, METHOD FOR MODELING STRUCTURE, SUPPORT METHOD FOR ADDITIVE MANUFACTURING OF STRUCTURE, AND RECORDING MEDIUM

(71) Applicant: TORAY ENGINEERING CO., LTD., Tokyo (JP)

(72) Inventors: Keiko Suda, Otsu (JP); Takamitsu Yamada, Otsu (JP)

(73) Assignee: TORAY ENGINEERING CO., LTD., Tokyo (JP)

( * ) Notice: Subject to any disclaimer, the term of this patent is extended or adjusted under 35 U.S.C. 154(b) by 390 days.

(21) Appl. No.: 16/623,847

(22) PCT Filed: Jun. 20, 2017

(86) PCT No.: PCT/JP2017/022625
§ 371 (c)(1),
(2) Date: Dec. 18, 2019

(87) PCT Pub. No.: WO2018/235150
PCT Pub. Date: Dec. 27, 2018

(65) Prior Publication Data
US 2020/0130281 A1 Apr. 30, 2020

(51) Int. Cl.
*B29C 64/386* (2017.01)
*B33Y 50/00* (2015.01)
(Continued)

(52) U.S. Cl.
CPC ............ *B29C 64/386* (2017.08); *B33Y 50/00* (2014.12); *G06F 30/23* (2020.01); *G06F 2113/10* (2020.01)

(58) Field of Classification Search
CPC ........ B29C 64/386; B33Y 50/00; G06F 30/23
(Continued)

(56) References Cited

U.S. PATENT DOCUMENTS

| 5,556,590 | A | * | 9/1996 | Hull | ....................... | B33Y 50/02 |
| | | | | | | 425/173 |
| 6,677,554 | B2 | * | 1/2004 | Darrah | ............... | G05B 19/4099 |
| | | | | | | 219/121.85 |

(Continued)

FOREIGN PATENT DOCUMENTS

| JP | 2003-39563 A | 2/2003 |
| WO | WO-2018235150 A1 * | 12/2018 ........... B29C 64/386 |

OTHER PUBLICATIONS

Zhang et al. (Role of anisotropic properties on topology optimization of additive manufactured load bearing structures,2016, Elsevier, pp. 148-152) (Year: 2016).*

(Continued)

*Primary Examiner* — Iftekhar A Khan
(74) *Attorney, Agent, or Firm* — Global IP Counselors, LLP

(57) ABSTRACT

A method for predicting a strength of a structure modeled by an additive manufacturing method includes acquiring a material layering method including at least one of a scanning direction, a scanning pitch, a layering direction, and a layering pitch of a material, and estimating the strength of the structure by factoring in strength anisotropy attributable to the material layering method.

17 Claims, 4 Drawing Sheets

(51) Int. Cl.
*G06F 30/23* (2020.01)
*G06F 113/10* (2020.01)

(58) Field of Classification Search
USPC .............................................................. 703/2
See application file for complete search history.

(56) References Cited

U.S. PATENT DOCUMENTS

| | | | | |
|---|---|---|---|---|
| 9,481,131 | B2* | 11/2016 | Yerazunis | B29C 64/393 |
| 10,239,258 | B2* | 3/2019 | Schmidt | B29C 64/386 |
| 2013/0001834 | A1* | 1/2013 | El-Siblani | B29C 64/124 |
| | | | | 264/401 |
| 2014/0154088 | A1* | 6/2014 | Etter | B23K 26/342 |
| | | | | 219/76.12 |
| 2014/0163445 | A1* | 6/2014 | Pallari | A61F 13/00029 |
| | | | | 604/290 |
| 2014/0306380 | A1* | 10/2014 | El-Siblani | B29C 64/393 |
| | | | | 425/150 |
| 2015/0086409 | A1* | 3/2015 | Hellestam | B28B 17/0081 |
| | | | | 264/497 |
| 2016/0224698 | A1* | 8/2016 | Rassaian | G06F 30/23 |
| 2017/0021455 | A1* | 1/2017 | Dallarosa | B22F 12/49 |
| 2017/0106594 | A1* | 4/2017 | Gardiner | B29C 70/384 |
| 2017/0136694 | A1* | 5/2017 | Rezai | B33Y 30/00 |
| 2017/0144380 | A1* | 5/2017 | Yagita | G05B 19/4099 |
| 2017/0341300 | A1* | 11/2017 | Rudolph | B29C 64/386 |
| 2018/0052445 | A1* | 2/2018 | Shapiro | G05B 19/4099 |
| 2018/0104922 | A1* | 4/2018 | Biisgen | B29C 69/02 |
| 2018/0276889 | A1* | 9/2018 | Zagade | G06F 30/23 |
| 2018/0319087 | A1* | 11/2018 | Eom | B29C 64/106 |
| 2018/0370114 | A1* | 12/2018 | Hopkins | B29C 64/209 |

OTHER PUBLICATIONS

Afrose et al. (Effects of part build orientations on fatigue behavior of FDM-processed PLA material, 2015, Springer International Publishing, pp. 21-28) (Year: 2015).*
International Search Report of the corresponding International Application No. PCT/JP2017/022625, dated Aug. 8, 2017.

* cited by examiner

SECOND LAYERING EXAMPLE OF MATERIAL

THIRD LAYERING EXAMPLE OF MATERIAL

METHOD FOR PREDICTING STRENGTH OF STRUCTURE, METHOD FOR MODELING STRUCTURE, SUPPORT METHOD FOR ADDITIVE MANUFACTURING OF STRUCTURE, AND RECORDING MEDIUM

CROSS-REFERENCE TO RELATED APPLICATIONS

This application is a U.S. National stage of International Application No. PCT/JP2017/022625, filed on Jun. 20, 2017.

BACKGROUND

Field of the Invention

The present invention relates to a method for predicting the strength of a structure, a method for modeling a structure, and a support method for the additive manufacturing of a structure.

Background Information

Methods for modeling a structure are known in the past (see, for example, Japanese Patent Application Publication No. 2003-039563 (Patent Literature 1)).

Patent Literature 1 discloses a method for modeling a structure in which a material is scanned in a specific direction to form a layer, and a three-dimensional structure is modeled by the additive manufacturing method in which a plurality of layers are built up.

SUMMARY

The method for modeling a structure described in Patent Literature 1 involves scanning the material in a specific direction to model the structure, so the strength of the structure thus modeled in a scanning direction can be different from that in a direction other than the scanning direction. Accordingly, a structure modeled by the additive manufacturing method as in Patent Literature 1 has a problem in that it is difficult to accurately predict the strength, unlike a structure that has been molded in a mold.

The present invention was conceived in an effort to solve the above problem, and it is an object of the present invention to provide a method for predicting the strength of a structure, a method for modeling a structure, a support method for an additive manufacturing of a structure, and a program, with which the strength of a structure modeled by an additive manufacturing method can be accurately predicted.

To achieve the stated object, the method for predicting a strength of a structure according to a first aspect of the invention is a method for predicting a strength of a structure modeled by an additive manufacturing method, the method comprising acquiring a material layering method including at least one of a scanning direction, a scanning pitch, a layering direction, and a layering pitch of a material; and estimating the strength of the structure by factoring in strength anisotropy attributable to the material layering method.

As mentioned above, this method for predicting a strength of a structure according to the first aspect of the invention involves acquiring the material layering method including at least one of the scanning direction, the scanning pitch, the layering direction, and the layering pitch of the material; and estimating the strength of the structure by factoring in the strength anisotropy attributable to the material layering method. This makes it possible to estimate the strength of the entire structure by factoring in the strength anisotropy of the structure based on the material layering method, so the strength of the structure modeled by the additive manufacturing can be accurately predicted.

In the method for predicting a strength of a structure according to the first aspect, it is preferable if the estimating of the strength includes grouping portions having a common material layering method, and estimating the strength of the structure on an assumption that the strength anisotropy of the grouped portions is equal. With this configuration, the strength can be predicted by the same analysis for grouped portions in which the layering method of the material is shared, so the prediction of the strength of the structure is less likely to be complicated.

In this case, it is preferable if the structure is configured such that after an edge is scanned, a core portion inside the edge is scanned to model a layer, and the estimating of the strength includes grouping the edge as a first group and estimating the strength of the edge of the structure, and grouping the core portion as a second group and estimating the strength of the core portion of the structure. With this configuration, using the edge that serves as the boundary surface of the structure as the first group, the strength at the boundary surface of the structure can be easily predicted. Also, since the strength can be predicted separately from the boundary surface of the structure by using the interior of the structure as a second group, the strength of the structure can be predicted with higher accuracy.

In the method for predicting a strength of a structure according to the first aspect, it is preferable if the structure is configured to be modeled so that the scanning direction of the material is different between adjacent layers, and the estimating of the strength includes estimating the strength of the structure on an assumption that the structure has the strength anisotropy in a plurality of directions. With this configuration, the strength of the structure can be estimated by providing the strength anisotropy in a plurality of directions, based on a plurality of scanning directions of the material, so the strength of the structure can be predicted with higher accuracy.

In the method for predicting a strength of a structure according to the first aspect, it is preferable if the estimating of the strength includes estimating the strength of a plurality of types of structure by varying the scanning direction of the material in layers, and the scanning direction of the material in the layers that models the structure is determined based on the estimated strength. With this configuration, since the scanning direction of the material in modeling the structure can be determined so as to satisfy the desired strength, the desired strength can be ensured in the structure that is modeled.

A method for modeling a structure according to the second aspect of the invention comprises estimating a strength of the structure to be modeled by factoring in strength anisotropy attributable to a scanning direction of a material in layers, and determining the scanning direction of the material that models the structure based on the estimated strength and modeling the structure by layering the material by an additive manufacturing method.

With this method for modeling a structure according to the second aspect of the invention, as mentioned above, the strength of the structure to be modeled is estimated by factoring in the strength anisotropy attributable to the scanning direction of the material in the layers. Consequently, the strength of the entire structure can be estimated by factoring in the strength anisotropy of the structure based on the scanning direction of the material, so the strength of the structure modeled by the additive manufacturing can be accurately predicted. Also, the structure is modeled by determining the scanning direction of the material that models the structure based on the estimated strength, and layering the material by the additive manufacturing method. Consequently, since the scanning direction of the material in modeling the structure can be determined so as to satisfy the desired strength, it is less likely that the strength of the structure thus modeled will decrease.

A support method for an additive manufacturing of a structure according to the third aspect of the invention comprises estimating a strength of the structure to be modeled by factoring in strength anisotropy attributable to the scanning direction of a material in layers, and teaching that if the estimated strength of the structure is below a specific value, the structure is modeled by adding a reinforcing member and by layering the material by an additive manufacturing method.

With the support method for an additive manufacturing of a structure according to the third aspect of the invention, as mentioned above, the strength of the structure to be modeled is estimated by factoring in the strength anisotropy attributable to the scanning direction of the material in the layers. Consequently, the strength of the entire structure can be estimated by factoring in the strength anisotropy of the structure based on the scanning direction of the material, so the strength of the structure modeled by additive manufacturing can be accurately predicted. Also, the method teaches that if the estimated strength of the structure is below the specific value, the structure is modeled by adding the reinforcing member and by layering the material by the additive manufacturing method. Consequently, the strength of the structure that is modeled can be effectively increased by reinforcing the structure with the reinforcing member.

A program according to the fourth aspect of the invention causes a computer to execute the method for predicting a strength of a structure according to the first aspect, the method for modeling a structure according to the second aspect, or the support method for an additive manufacturing of a structure according to the third aspect.

With this program according to the fourth aspect of the invention, as mentioned above, a computer is made to execute the method for predicting a strength of a structure according to the first aspect, the method for modeling a structure according to the second aspect, or the support method for an additive manufacturing of a structure according to the third aspect, which allows the strength of the structure modeled by the additive manufacturing to be accurately predicted.

As discussed above, the present invention allows the strength of a structure modeled by an additive manufacturing to be accurately predicted.

DETAILED DESCRIPTION OF EMBODIMENTS

Embodiments of the present invention will now be described with reference to the drawings.

Embodiment

Configuration of Structure Modeling Device

The configuration of a structure modeling device 100 according to this embodiment will be described through reference to FIGS. 1 to 7.

Figure 1:
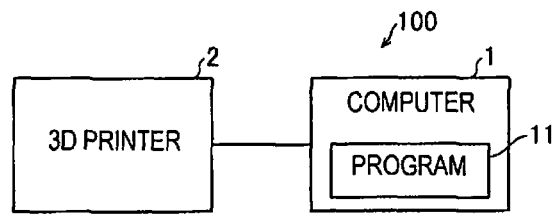
FIG. 1 is a simplified block diagram of a structure modeling device according to an embodiment.

As shown in FIG. 1, the structure modeling device 100 comprises a computer 1 and a 3D printer 2. The computer 1 is configured to be able to execute a program 11.

Figure 2:
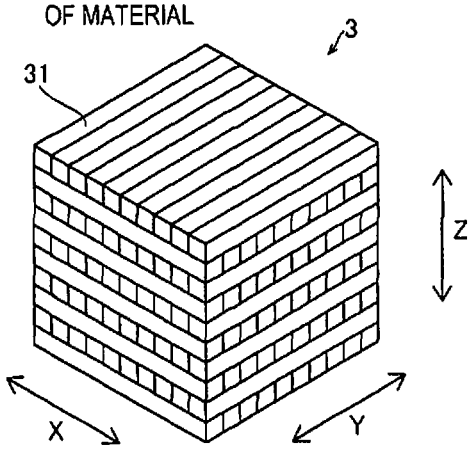
FIG. 2 is a diagram showing a first layering example of materials according to an embodiment.

The computer 1 is configured to perform control to model the structure 3 with the 3D printer 2 based on three-dimensional data for the structure 3 (see FIG. 2). Also, the computer 1 is configured to execute the program 11 to predict (estimate) the strength of the structure 3 to be modeled. The computer 1 that executes the strength prediction can be provided separately from the 3D printer 2. That is, if the computer 1 can read layering information from the 3D printer 2 in the form of electronic data, then it can predict the strength of the structure 3 even if it is provided separately from the 3D printer 2.

The 3D printer 2 is configured to model a solid (three-dimensional) structure 3 by additive manufacturing. More specifically, the 3D printer 2 is configured to model the structure 3 by scanning a thread-like material 31 in a specific direction. The 3D printer 2 is also configured to model the structure 3 by layering the material 31. For instance, as shown in FIG. 2, the 3D printer 2 is configured such that a step of forming a layer by scanning the material 31 in the X direction, and a step of forming a layer by scanning the material 31 in the Y direction, which is perpendicular to the X direction, are repeated to model the structure 3 by layering the material 31 in the Z direction. A resin or metal that can be melted by the 3D printer 2 is used for the material 31. For example, the 3D printer 2 models the structure 3 by fused deposition modeling (FDM). The structure 3 shown in FIGS. 2 to 5 has a cubic shape, but the shape of the structure 3 is not limited to cubic.

In this embodiment, the computer 1 is configured to acquire a layering method of the material 31 including at least one of the scanning direction, the scanning pitch, the layering direction, and the layering pitch of the material 31. The computer 1 is configured to estimate the strength of the structure 3 by factoring in the strength anisotropy attributable to the layering method of the material 31. The computer 1 is also configured to estimate the strength of the structure 3 by modeling the strength anisotropy. The scanning direction of the material 31 can be set by the 3D printer 2, or information set by the computer 1 can be used by the 3D printer 2. For example, a program for predicting the strength need not be installed in the computer that controls the 3D printer 2. That is, the computer that predicts the strength of the structure 3 and the computer that operates the 3D printer 2 can be separate computers. Also, the scanning pitch and the layering pitch of the material 31 can be set based on the thickness of the thread-like material 31. The layering direction can be the Z direction (up and down direction), the horizontal direction (XY direction), or an oblique direction at an angle to the horizontal direction.

Figure 3:
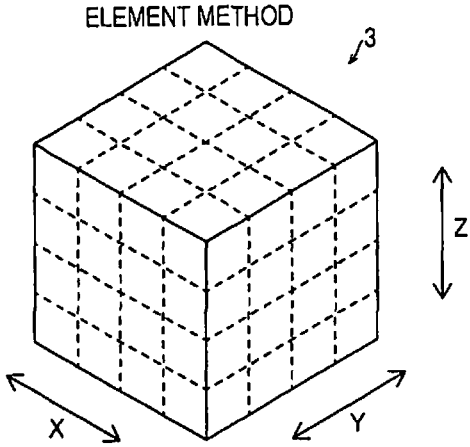
FIG. 3 is a diagram showing a mesh example of a finite element method of a structure according to an embodiment.

The computer 1 is configured to predict (estimate) the strength of the structure 3 by a finite element method. For example, as shown in FIG. 3, the computer 1 is configured such that the structure 3 is virtually divided up into a plurality of meshes, physical properties such as elastic modulus, Poisson's ratio, Young's modulus, and density are assigned to each mesh, and the overall strength of the structure 3 is predicted (estimated). The mesh interval is set to be greater than the diameter of the thread-like material 31. This makes it less likely that the mesh interval will be too small or that the total number of meshes will be too large, so the strength prediction processing performed by the computer 1 can be kept from being too complicated.

Figure 4:
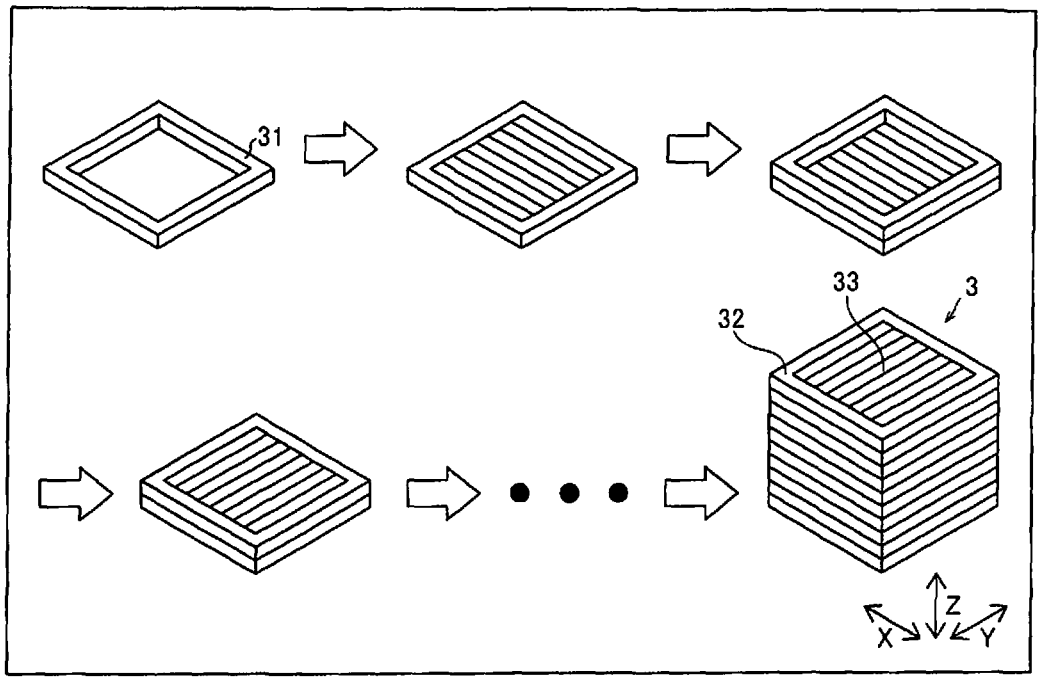
FIG. 4 is a diagram showing a second layering example of materials according to an embodiment.

In addition, the computer 1 is configured to estimate the strength of the structure 3 by grouping portions of the material 31 having a common layering method and making the strength anisotropy of the strength of the grouped portions be equal. For example, as shown in FIG. 4, the computer 1 is configured such that when a layer is modeled by scanning the edge of the structure 3 and then scanning the core portion inside the edge, the edge is grouped as a first group 32 and the strength of the edge of the structure 3 is estimated, and the core portion is grouped as a second group 33 and the strength of the core portion of the structure 3 is estimated. Here, when the edge is extremely thin as in FIG. 4, if the mesh (elements) is divided up equally as in FIG. 3, there is the risk that the outermost peripheral elements will be a mix of both the edge and the internal core portion, preventing accurate strength estimation. Therefore, the shape of the elements for predicting the strength can be made different between the first group 32 and the second group 33. For example, the prediction (estimation) of the strength can be performed by considering the first group 32 as a group of plate-shaped elements, and considering the second group 33 as a group of cube-shaped elements. In this case, the first group 32, which is the edge of the structure 3, is divided into elements having a thickness substantially equal to the edge. This makes it less likely that a plurality of groups will be mixed in one element, so it is possible to estimate strength more accurately. In addition, since strength can be estimated while suppressing an excessive increase in the number of elements needed for predicting the strength, it is possible to suppress an increase in the processing load of strength estimation, and it is also possible to make it less likely that the processing will take more time.

Also, as shown in FIG. 2, the computer 1 is configured such that when the structure 3 is modeled so that the scanning direction of the material 31 is different between adjacent layers, the strength of the structure 3 is estimated on the assumption that the structure 3 has strength anisotropy in a plurality of directions.

The computer 1 is also configured such that the strength of a plurality of types of structure 3 is estimated by changing the scanning direction (layering method) of the material 31 in the layers, and the scanning direction of the material 31 in the layers modeling the structure 3 is determined based on the estimated strength. For example, the computer 1 performs control to model the structure 3 depending on the scanning direction (layering method) of the material 31 modeling the structure 3 for which the highest strength is obtained out of the plurality of types of structure 3 with different scanning directions of the material 31. Also, when the direction in which the load is exerted on the completed structure 3 is determined in a specific direction, evaluation can be performed with emphasis on the strength in that specific direction. For instance, control can be performed so that the structure 3 is modeled by deciding on the scanning direction (layering method) of the material 31 so that the strength increases in a specific direction in which the load exerted on the structure 3 increases.

Figure 5:
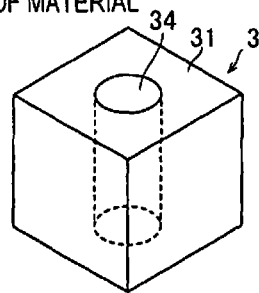
FIG. 5 is a diagram showing a third layering example of materials according to an embodiment.

The computer 1 is also configured so that the structure 3 is modeled by deciding on the scanning direction of the material 31 modeling the structure 3 based on the estimated strength, and controlling the 3D printer 2 to layer the material 31 by the additive manufacturing. The computer 1 is also configured so that when the estimated strength of the structure 3 is below a specific value, the computer 1 teaches that, as shown in FIG. 5, a reinforcing member 34 is added, and the structure 3 is modeled by layering the material 31 by the additive manufacturing.

Figure 6:
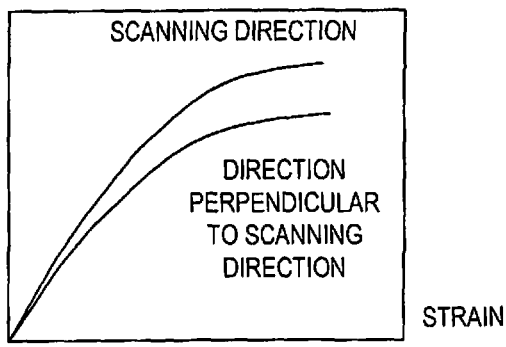
FIG. 6 is a graph of stress versus strain for creating the physical properties of a structure according to an embodiment.

For example, when estimating (creating) the physical properties of the structure 3, as shown in FIG. 6, the computer 1 estimates the physical properties so that the stress versus strain will be different between the scanning direction of the material 31 and a direction that is perpendicular to the scanning direction. For example, the physical properties are estimated by reducing the stress in the direction perpendicular to the scanning direction relative to the stress in the scanning direction by a specific ratio. That is, the computer 1 estimates the physical properties based on the layering method. In this case, the physical properties can be found based on experimental values, or can be found by calculation such as a homogenization method.

Figure 7:
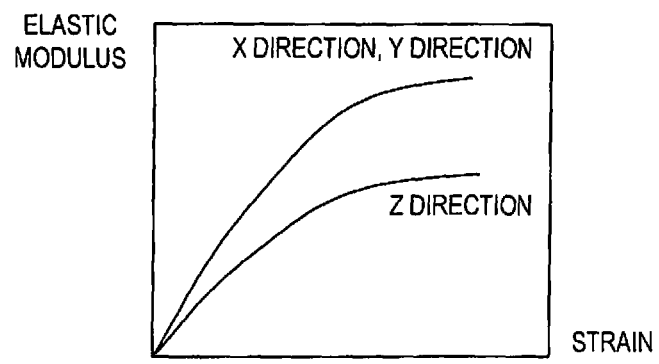
FIG. 7 is a graph of an example of the physical properties for predicting the strength of a structure according to an embodiment.

Also, as shown in FIG. 7, the computer 1 assigns physical properties to each mesh of the finite element method (see FIG. 3) by factoring anisotropy, based on the estimated physical properties. For example, when layering is done as in the first layering example shown in FIG. 2, the physical properties in the X direction and the Y direction (scanning direction) are assigned so as to be equal, and the physical properties in the Z direction (layering direction) are assigned so as to be smaller than in the X direction and the Y direction. The computer 1 is configured to predict the strength of the structure 3 by adding constraint conditions and load conditions to these physical properties.

The computer 1 is also configured to determine breakage of the structure 3 based on the strength of the structure 3, factoring in the strength anisotropy attributable to the layering method of the material 31.

Structure Strength Prediction Processing

Next, the processing for predicting the strength of a structure will be described with reference to FIG. 8. This structure strength prediction processing is executed by the computer 1.

Figure 8:
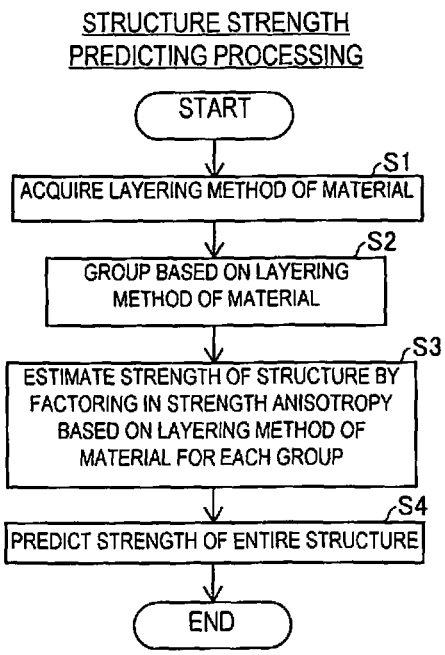
FIG. 8 is a flowchart illustrating structure strength prediction processing according to an embodiment.

In step S1 in FIG. 8, the layering method of the material 31 is acquired. The layering method of the material 31 can be determined based on the shape of the structure 3, or can be determined by the user. In step S2, grouping is performed based on the layering method of the material 31. More specifically, portions having the same layering method of the material 31 are grouped together. For example, in the second layering example shown in FIG. 4, the edge is grouped as the first group 32 and the core portion (filled-in portion) is grouped as the second group 33. In the first layering example shown in FIG. 2, the entire structure 3 forms a single group.

In step S3, the partial strength of the structure 3 is estimated for each group by factoring in the strength anisotropy attributable to the layering method of the material 31. In step S4, the strength of the entire structure 3 is predicted. After this, the structure strength prediction processing is concluded.

Structure Modeling Processing

Next, the processing for modeling a structure will be described with reference to FIG. 9. This structure modeling processing is executed by the computer 1.

Figure 9:
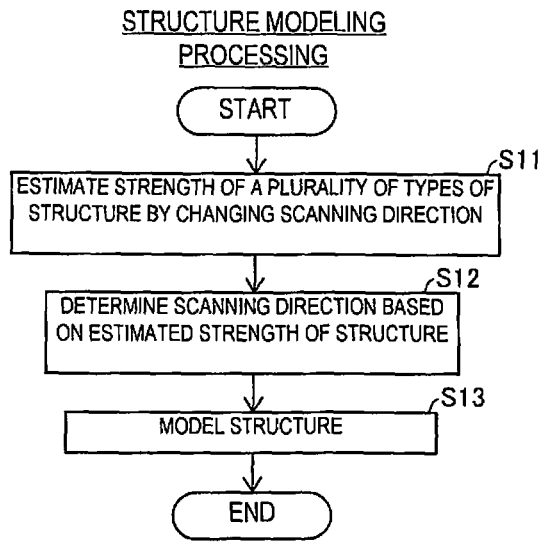
FIG. 9 is a flowchart illustrating structure modeling processing according to an embodiment.

In step S11 in FIG. 9, the strength is estimated for a plurality of types of structure 3 in which the scanning direction (layering method) of the material 31 is changed. In step S12, the scanning direction (layering method) of the material 31 is determined based on the estimated strength of the structure 3. That is, the scanning direction (layering method) is determined so as to model the structure 3 so that the strength is increased.

In step S13, the 3D printer 2 is controlled to model the structure 3 according to the determined scanning direction (layering method). After this, the structure modeling processing is concluded.

Structure Modeling Method Teaching Processing

Next, the processing for teaching the method for modeling a structure will be described with reference to FIG. 10. This structure modeling method teaching processing is executed by the computer 1.

Figure 10:
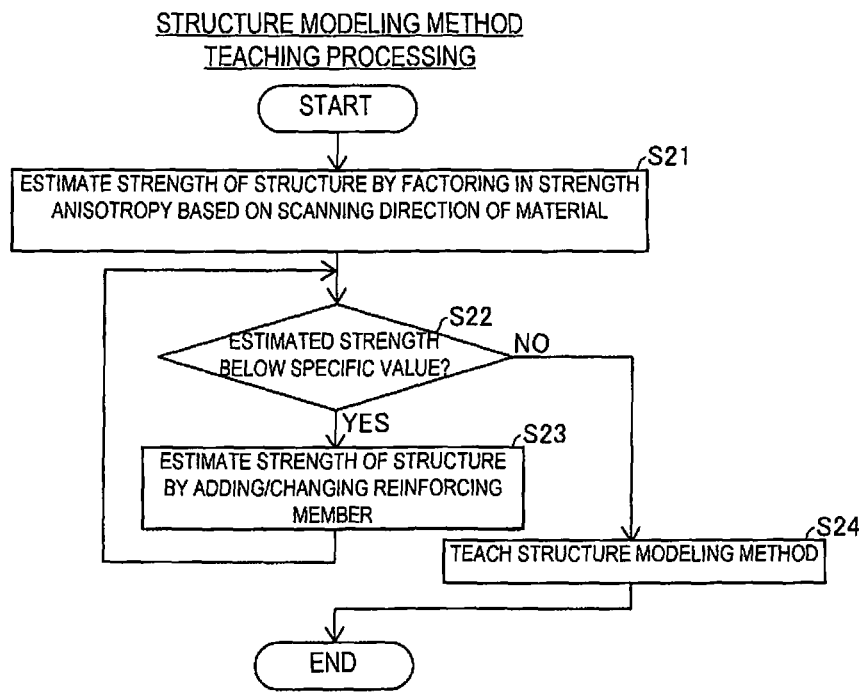
FIG. 10 is a flowchart illustrating modeling method teaching processing for a structure according to an embodiment.

In step S21 in FIG. 10, the strength of the structure 3 is estimated by factoring in the strength anisotropy attributable to the scanning direction (layering method) of the material 31. In step S22, it is determined whether or not the estimated strength of the structure 3 is below a specific value. If it is below the specific value, the processing proceeds to step S23, and if it is equal to or greater than the specific value, the processing proceeds to step S24. The specific value can be determined by multiplying the predicted maximum stress by a safety factor.

In step S23, as shown in FIG. 5, the reinforcing member 34 is added and the strength of the structure 3 is estimated. The reinforcing member 34 is formed in a columnar shape from metal, for example. When the reinforcing member 34 has been added, with the structure 3, the material 31 is scanned and layered all around the reinforcing member 34 in a state in which the reinforcing member 34 is vertical. The reinforcing member 34 preferably has different physical properties from those of the material 31. In particular, it is preferable if the reinforcing member 34 has higher strength than the material 31. After this the processing returns to step S22.

In step S22, it is determined whether or not the strength of the structure 3 estimated by adding the reinforcing member 34 is below than the specific value. If it is equal to or greater than the specific value, the processing proceeds to step S24. If it is below the specific value, the processing proceeds to step S23, the reinforcing member 34 is changed, and the strength of the structure 3 is estimated. As the reinforcing member 34 after this change, one having a higher strength than the reinforcing member 34 before the change is selected. For instance, the reinforcing member 34 after the change can be selected from materials having a higher strength than that of the reinforcing member 34 before the change. Also, the reinforcing member 34 after the change can be selected to have a structure with a higher strength than with the reinforcing member 34 before the change. Also, the reinforcing member 34 after the change can be selected to be larger than the reinforcing member 34 before the change. After this, the processing returns to step S22. In step S22, the processing in steps S22 to S23 is repeated until it is determined that the estimated strength of the structure 3 is equal to or greater than the specific value.

If it is determined in step S22 that the estimated strength of the structure 3 is greater than or equal to the specific value, a modeling method with which the strength of the structure 3 will be greater than or equal to the specific value is taught in step S24. After this, the structure modeling method teaching processing is concluded.

Effect of this Embodiment

Next, the effect of this embodiment will be described.

In this embodiment, as described above, the layering method of the material 31, including at least one of the scanning direction, the scanning pitch, the layering direction, and the layering pitch of the material 31, is acquired, and the strength of the structure 3 is estimated by factoring in the strength anisotropy attributable to the layering method of the material 31. Consequently, the strength of the entire structure 3 can be estimated by factoring in the strength anisotropy of the structure 3 attributable to the layering method of the material 31, so the strength of a structure 3 modeled by the additive manufacturing can be accurately predicted.

In this embodiment, as described above, portions having the same layering method of the material 31 are grouped together, and the strength of the structure 3 is estimated on the assumption that the strength anisotropy of the grouped portions is equal. Consequently, the strength can be predicted by the same analysis for grouped portions in which the layering method of the material 31 is shared, so the prediction of the strength of the structure 3 is less likely to be complicated.

In this embodiment, as described above, the edge is grouped as the first group 32 to estimate the strength of the edge of the structure 3, and the core portion is grouped as the second group 33 to estimate the strength of the core portion of the structure 3. Consequently, the edge, which is the boundary surface of the structure 3, can be grouped as the first group 32 and the strength of the boundary surface of the structure 3 can be easily predicted. Also, since the interior of the structure 3 can be grouped as the second group 33 and its strength predicted separately from that at the boundary surface of the structure 3, the strength of the structure 3 can be predicted with higher accuracy.

In this embodiment, as described above, when the structure 3 is modeled so that the scanning direction of the material 31 is different between adjacent layers, the strength of the structure 3 is estimated by assuming that the structure 3 has strength anisotropy in a plurality of directions. Consequently, the strength of the structure 3 can be estimated by providing the strength anisotropy in a plurality of directions, based on a plurality of scanning directions of the material 31, so the strength of the structure 3 can be predicted with higher accuracy.

In this embodiment, as described above, the strength of a plurality of types of structure 3 is estimated by changing the scanning direction of the material 31 in the layers, and the scanning direction of the material 31 in the layers modeling the structure 3 is determined based on the estimated strength. Consequently, the scanning direction of the material 31 when modeling the structure 3 can be decided on so as to satisfy the desired strength, so the desired strength can be ensured in the structure 3 that is modeled.

In this embodiment, as described above, the structure 3 is modeled by determining the scanning direction of the material 31 modeling the structure 3 based on the estimated strength, and layering the material 31 by the additive manufacturing. Consequently, the scanning direction of the material 31 in modeling the structure 3 can be decided on so as to satisfy the desired strength, so it is less likely that the strength of the structure 3 thus modeled will be lower.

Also, in this embodiment, as described above, if the estimated strength of the structure 3 is below the specific value, the user is taught to add the reinforcing member 34 and model the structure 3 by layering the material 31 by the additive manufacturing. Consequently, the structure 3 is reinforced by the reinforcing member 34 and the strength of the structure 3 that is modeled can be effectively increased.

Modification Example

The embodiment disclosed here should be considered as illustrative in all respects and not limiting in nature. The scope of the invention being indicated by the claims rather than by the above description of an embodiment, all changes (modification examples) within the meaning and range of equivalency of the claims are included.

For example, in the above embodiment, an example was given of modeling a structure by the fused deposition modeling, but the present invention is not limited to this. With the present invention, the structure can be modeled by an additive manufacturing method other than the fused deposition modeling. For instance, the structure can be modeled by the photo fabrication method, the inkjet method, or the like.

Also, in the above embodiment, an example was given of a configuration for predicting (estimating) the strength of a structure by the finite element method, but the present invention is not limited to this. With the present invention, the strength of the structure can be predicted (estimated) by some method other than the finite element method. For example, the strength of the structure can be predicted by the finite difference method, the boundary element method, the particle method, or the like.

Also, in the above embodiment, an example was given of a configuration for estimating the strength of a structure based on the layering method of the material, including the layering direction and the layering pitch, but the present invention is not limited to this. Here, although the effect is small compared with the layering direction, the layering pitch, etc., the material shrinkage and the discharge amount from the 3D printer vary with the material temperature during modeling, so warpage deformation, local density changes, and the like can occur and can affect the strength of the structure. For this reason, in the present invention, information about the material temperature can also be acquired to estimate the strength of the structure.

Also, in the above embodiment, an example was given of a configuration in which the edge and the core portion of a structure were divided into different groups and the strength of the structure was predicted, but the present invention is not limited to this. With the present invention, the strength of the structure can be predicted by grouping something other than the edge and core portion of the structure. Also, the strength of a structure can be predicted by dividing into three or more groups.

Also, in the above embodiment, an example was given of a configuration in which the material was scanned in two perpendicular directions, namely, the X direction and the Y direction, but the present invention is not limited to this. With the present invention, the material can be scanned in one direction, or can be scanned in three or more directions. When scanning in a plurality of directions, the scanning directions need not be perpendicular to each other.

Also, in the above embodiment, an example was given of a configuration in which the inside of the structure was solidly modeled, but the present invention is not limited to this. With the present invention, the inside of the structure can be hollow. In this case, in order to ensure enough strength, a column or beam can be modeled in the hollow portion.

Also, in the above embodiment, an example was given of a configuration in which the reinforcing member had a cylindrical shape, but the present invention is not limited to this. With the present invention, the reinforcing member can have a shape other than a cylindrical shape. For example, the reinforcing member can have a prismatic shape, or can have a bent or curved shape.

Also, in the above embodiment, an example was given of a configuration in which the reinforcing member was formed from metal, but the present invention is not limited to this. With the present invention, the reinforcing member can be formed of something other than metal. For example, the reinforcing member can be formed from a resin, FRP (fiber reinforced plastic), or the like.

In the above embodiment, for convenience of explanation, a flow-driven flowchart was used in which the processing operations of the computer were carried out sequentially according to the processing flow, but the present invention is not limited to this. With the present invention, the processing operations of the computer can be carried out by event-driven processing that executes processing in event units. In this case, the processing can be completely event driven, or can be a combination of event driven and flow driven.

The invention claimed is:

1. A method for predicting a strength of a structure modeled by an additive manufacturing method using a three-dimensional printer, the method comprising:
acquiring, by a computer, a material layering method from the three-dimensional printer, the material layering method being a digital data indicative of at least a scanning direction and a layering direction of a material while modeling the structure by the additive manufacturing method using the three-dimensional printer; and
estimating, by the computer, the strength of the structure based on the scanning direction and the layering direction indicated by the material layering method by reducing a strength of the structure in a direction perpendicular to the scanning direction and the layering direction with respect to a strength of the structure in the scanning direction to factor in strength anisotropy attributable to the material layering method.

2. The method for predicting a strength of a structure according to claim 1, wherein
the estimating of the strength includes grouping a core portion of the structure inside an edge of the structure as a group, and estimating a strength of the core portion of the structure based on an assumption that the strength anisotropy of the core portion is equal.

3. The method for predicting a strength of a structure according to claim 2, wherein
the structure is configured to be modeled such that after the edge is scanned, the core portion is scanned to model a layer of the structure, and
the estimating of the strength includes grouping the edge as a first group and estimating a strength of the edge of the structure, and grouping the core portion as a second group and estimating the strength of the core portion of the structure.

4. The method for predicting a strength of a structure according to claim 1, wherein
the structure is configured to be modeled so that the scanning direction of the material is different between adjacent layers, and
the estimating of the strength includes estimating the strength of the structure on an assumption that the structure has the strength anisotropy in a plurality of directions.

5. The method for predicting a strength of a structure according to claim 1, wherein
the estimating of the strength includes estimating the strength of a plurality of types of structure by varying the scanning direction of the material in layers, and
the scanning direction of the material in the layers that models the structure is determined based on the estimated strength.

6. A method for modeling a structure by an additive manufacturing method using a three-dimensional printer, the method comprising:
estimating, by a computer, a strength of the structure to be modeled based on a scanning direction and a layering direction of a material for modeling the structure by the additive manufacturing method using the three-dimensional printer by reducing a strength of the structure in a direction perpendicular to the scanning direction and the layering direction with respect to a strength of the structure in the scanning direction to factor in strength anisotropy attributable to the scanning direction of the material in layers;
determining, by the computer, a scanning direction of the material that models the structure based on the estimated strength; and
modeling, by the three-dimensional printer, the structure by layering the material by the additive manufacturing method based on the determined scanning direction of the material.

7. A support method for modeling a structure by an additive manufacturing method using a three-dimensional printer, the support method comprising:
estimating, by a computer, a strength of the structure to be modeled based on a scanning direction and a layering direction of a material for modeling the structure by the additive manufacturing method using the three-dimensional printer by reducing a strength of the structure in a direction perpendicular to the scanning direction and the layering direction with respect to a strength of the structure in the scanning direction to factor in strength anisotropy attributable to the scanning direction of the material in layers;
determining, by the computer, whether the estimated strength of the structure is below a specific value;
updating, by the computer, the structure by adding a reinforcing member in response to determining the estimated strength of the structure is below the specific value;
repeating, by the computer, the updating of the structure and the estimating of the strength of the structure while determining the estimated strength of the structure is below the specific value; and
teaching, by the computer, a material layering method for modeling the structure by layering the material by the additive manufacturing method using the three-dimensional printer in response to determining the estimated strength of the structure is not below the specific value.

8. A non-transitory computer-readable recording medium storing a program that causes the computer to execute the method for predicting a strength of a structure according to claim 1.

9. The method for predicting a strength of a structure according to claim 2, wherein
the structure is configured to be modeled so that the scanning direction of the material is different between adjacent layers, and
the estimating of the strength includes estimating the strength of the structure on an assumption that the structure has the strength anisotropy in a plurality of directions.

10. The method for predicting a strength of a structure according to claim 3, wherein
the structure is configured to be modeled so that the scanning direction of the material is different between adjacent layers, and
the estimating of the strength includes estimating the strength of the structure on an assumption that the structure has the strength anisotropy in a plurality of directions.

11. The method for predicting a strength of a structure according to claim 2, wherein
the estimating of the strength includes estimating the strength of a plurality of types of structure by varying the scanning direction of the material in layers, and
the scanning direction of the material in the layers that models the structure is determined based on the estimated strength.

12. The method for predicting a strength of a structure according to claim 3, wherein
the estimating of the strength includes estimating the strength of a plurality of types of structure by varying the scanning direction of the material in layers, and
the scanning direction of the material in the layers that models the structure is determined based on the estimated strength.

13. The method for predicting a strength of a structure according to claim 4, wherein
the estimating of the strength includes estimating the strength of a plurality of types of structure by varying the scanning direction of the material in layers, and
the scanning direction of the material in the layers that models the structure is determined based on the estimated strength.

14. The method for predicting a strength of a structure according to claim 9, wherein
the estimating of the strength includes estimating the strength of a plurality of types of structure by varying the scanning direction of the material in layers, and
the scanning direction of the material in the layers that models the structure is determined based on the estimated strength.

15. The method for predicting a strength of a structure according to claim 10, wherein
the estimating of the strength includes estimating the strength of a plurality of types of structure by varying the scanning direction of the material in layers, and
the scanning direction of the material in the layers that models the structure is determined based on the estimated strength.

16. A non-transitory computer-readable recording medium storing a program that causes the computer to execute the method for modeling a structure according to claim 6.

17. A non-transitory computer-readable recording medium storing a program that causes the computer to execute the support method for an additive manufacturing of a structure according to claim 7.

* * * * *